United States Patent

[11] 3,619,237

[72] Inventor Albert W. Leclair
Hudson, N.H.
[21] Appl. No. 805,839
[22] Filed Mar. 10, 1969
[45] Patented Nov. 9, 1971
[73] Assignee Nashua Corporation
Nashua, N.H.

[54] COPY SHEET UTILIZING CERTAIN ACETOACETONITRILES
4 Claims, No Drawings

[52] U.S. Cl. .......... 117/36.2, 117/36.8, 96/48 HD, 96/90 R
[51] Int. Cl. .......... B41m 5/22
[50] Field of Search .......... 117/36.2, 36.8, 36.9; 96/90, 48 HD

[56] References Cited

UNITED STATES PATENTS

| | | | |
|---|---|---|---|
| 2,680,062 | 6/1954 | Sus | 117/36.8 |
| 2,976,294 | 3/1961 | Firestine | 96/90 X |
| 3,076,707 | 2/1963 | Lawton et al. | 117/36.8 X |
| 3,094,414 | 6/1963 | Workman | 96/90 X |

*Primary Examiner*—Murray Katz
*Attorney*—Kenway, Jenney and Hildreth

ABSTRACT: A thermographic copy sheet capable of being rendered thermographically inactive upon exposure to short wave length radiation is formed from acetoacetonitrile derivatives such as 2-phenyl acetoacetonitrile, and a material reactive with it to form a color, such as a silver slat. A dye sensitizer may be included to shift the spectral response.

COPY SHEET UTILIZING CERTAIN ACETOACETONITRILES

This invention relates to thermographic copying and provides thermographic copy sheets which may be rendered thermographically insensitive by exposure to actinic radiation.

In thermographic copying, heat energy, generally from an infrared source, is utilized to bring about a color-forming reaction in the copy sheet. In one type, the heat sensitive sheet is brought into face-to-face contact with a graphic original which carries an image formed of heat absorbing material. When these are exposed to infrared radiation, the image portion of the original is selectively heated to cause the development in the adjacent sheet of a color pattern corresponding to the original. In another type, one of the color-forming components of the copy sheet is destroyed or otherwise rendered inactive by exposure to short wavelength radiation in the portions corresponding to the white, nonimage areas, thereafter the application of heat or infrared radiation causes color formation in the image areas. This latter type of system has the advantage that the final copy does not remain heat sensitive, as the reactivity of the system has been destroyed by the short wavelength radiation. It is primarily to this type of system that the present invention is directed.

The system of this invention may utilize a single sheet having a coating containing reactive components, one of which is rendered inactive by exposure to short wavelength radiation. Known systems of this type are described by Lawton and Lopez, U.S. Pat. No. 3,076,707 and by Grant, U.S. Pat. No. 3,094,619, which utilize color-forming systems employing diazonium compounds and alpha napthols respectively. In these systems the copy sheet may be exposed to a short wavelength, e.g. ultraviolet radiation image of the original to be copied, to inactivate all but the unexposed black areas of the copy sheet, and then heated to develop color in the black areas where the components remain reactive. Alternatively the copy sheet may be initially exposed to infrared radiation while being in contact with the graphic original, to bring about a color-forming reaction in the areas in contact with the black parts of the original, and then subsequently exposed to short wavelength radiation to inactivate the unreacted parts of the sheet.

Two-sheet systems are also known, as exemplified by Benbrook, U.S. Pat. No. 2,789,904 and Workman, U.S. Pat. No. 3,094,417, in which the reactant susceptible of being deactivated by exposure to short wavelength radiation is carried on a sheet separate from the sheet which carries the material with which it enters into a color-forming reaction. In utilizing the two-sheet system, the sheet containing the deactivatable component is first exposed to a short wave radiation image of the original to be copied to cause deactivation of the exposed portions. This sheet is then brought into contact with a sheet containing the other color-forming components and heated to bring about a color-forming reaction in the unexposed areas. The two-sheet system requires that one of the color-forming reactants will transfer when heated from one sheet to the other sufficiently to bring about the color-forming reaction.

The present invention is based on the discovery that certain acetoacetonitrile derivatives are useful in a number of color-forming reactions and may also be rendered inactive by exposure to short wavelength radiation. This invention accordingly provides systems in addition to those previously known for providing permanent heat insensitive copies by thermographic means.

In general the system of this invention utilizes an acetoacetonitrile derivative and a compound with which it enters into a color-forming reaction. The compound may be for instance a silver salt which reacts with the nitrile to form a color or a compound of another metal with which the nitrile reacts to form a colored complex. The nitrile and color-forming compound may be combined in a suitable binder and applied to a backing sheet of paper or the like in a single coating, they may be applied in separate coatings in face to face contact on a single backing sheet, or they may be applied as separate coatings on separate sheets.

The nitrile is desensitized by exposure to ultraviolet radiation, but may also be rendered sensitive to actinic radiation of longer wavelength, for instance that form a tungsten filament lamp, by introducing a dye sensitizer in accordance with well known photochemical technology. Dye sensitizers like erythrosin have been found to be quite suitable, but others may be used. Typical examples of thermographic copy systems of this invention are described in the following examples.

EXAMPLE I

A preferred short wavelength sensitive sheet useful for instance, with the "white" sheet of the commercial so-called Dual Spectrum paper sold by Minnesota Mining and Manufacturing Company consists of a thin, e.g. glassine, paper base coated with a solution of the nitrile to a coated weight of 1.0 lbs. per 3,000 square feet. A suitable coating composition consists of ethyl acetate—50 grams 2(p-chloro-phenyl) acetoacetonitrile—0.2 grams ethyl cellulose (Hercules N-10)—5 grams applied by a Mayer Rod and coated and dried.

Exposure of the sheet to ultraviolet radiation, e.g. from an Hanovia Ultra Violet Quartz Lamp Type 30620 140 Watts results in inactivation in the exposed "nonimage" areas. If the sheet is then placed in contact with a 3M Dual Spectrum white sheet (described in U.S. Pat. No. 3,094,417) and heated, an image is formed on the white sheet.

EXAMPLE II

A thermosensitive sheet capable of desensitization following activation may be formed by applying the nitrile coating composition described in example I to a 3M Dual Spectrum white sheet and drying. This sheet may then be used for thermographic recording, following which exposure to ultraviolet radiation results in desensitization of the white unactivated areas.

EXAMPLE III

A sheet sensitive to tungsten radiation may be formed by adding a dye sensitizer to the nitrile. A coating composition of this type may consist of ethyl acetate—50 grams ethyl cellulose (Hercules N-10)—5 grams erythrosin—0.01 grams 2(p-chloro-phenyl) acetoacetonitrile—0.2 grams A sheet of paper coated as in example I may be used in place of the 3M Dual Spectrum pink sheet in the Dual Spectrum machine and then placed in contact with a 3M Dual Spectrum white sheet and heated in the usual manner. It will become deactivated by exposure to light of wavelengths of about 4,000 to 7,000 angstroms.

The nitrile derivatives useful in the copy sheets provided by this invention have been found to form colored complexes with salts of the metals Cu+30 and Fe+++. These provide a basis for other color-forming systems than the silver soap coated sheets used in the preceding examples. For instance the nitrile coated sheet of example III may be used with a second sheet which carries a coating of

| | |
|---|---|
| Ferric stearate | 1.26 parts by weight |
| Ethyl cellulose Hercules N-10) | 1.25 parts by weight |
| Toluene | 32.00 parts by weight |

The above mixture is coated onto a white bond paper sheet to a dry weight of about 2 lbs. per 3,000 square feet and dried. When the sheet is placed coated face to coated face with the nitrile coated sheet of example III and heated in the manner described, a positive pale blue image on a yellowish background is formed.

Other acetoacetonitriles which have been found useful are: 2(p methoxy-phenyl) acetoacetonitrile 2(p fluoro-phenyl) acetoacetonitrile 2(m-methyl-phenyl) acetoacetonitrile 2(p-methyl-phenyl) acetoacetonitrile 2(p-phenyl-phenyl) acetoacetonitrile 2(3,4 dimethoxy-phenyl) acetoacetonitrile 2(p bromo-phenyl) acetoacetonitrile 2(2,5 dichloro-phenyl)

acetoacetonitrile 2(p iodo-phenyl) acetoacetonitrile 2(m-chloro-phenyl) acetoacetonitrile 2(3,4,5 trimethoxy-phenyl) acetoacetonitrile Also compounds of the following structural formulas:

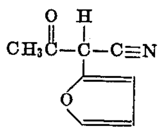
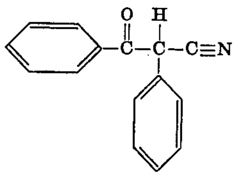
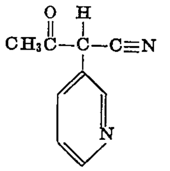
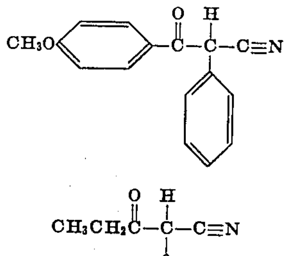
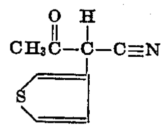
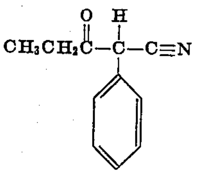
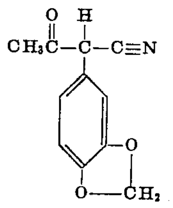
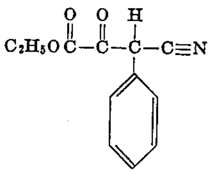

The nitriles useful in this invention are of the general structure

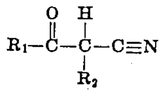

and it will be seen from the foregoing examples that $R_1$ may be alkyl, alkoxy, aromatic or substituted aromatic groups, or aralkyl groups $R_2$ may be aromatic, substituted aromatic, or heterocyclic groups. In addition, compounds closely related to the acetoacetonitriles may be employed as the foregoing list indicates.

In using these other compounds, they may simply be substituted for the —chloro compound used in the examples. The results will vary from good to poor but in each case a discernible copy is produced. Heating and exposure times may vary, but can be readily determined.

Dye sensitizers other than erythrosin (2′, 4′, 5′, 7′ tetraiodofluorescein) that may be used include Rose Bengal, Safranin-O, Methylene blue, Eosin-Y and Seto flavine-T, all of which are well known as being effective to shift the spectral response of a photosensitive material into the visual range.

Although this invention has been described with reference to acetoacetonitrile derivatives, it should be noted that these are generally regarded to exist, not in the keto form generally used by those skilled in the art and indicated herein, but principally in the enol form. Thus although phenyl aceto-acetonitrile and derivatives of it has been described herein as being

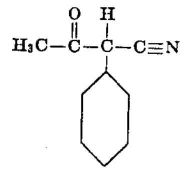

it is contemplated that in actual fact the compounds utilized in this invention are of the enol structure

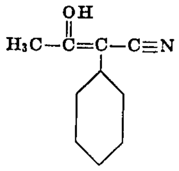

Having thus disclosed my invention and described in detail preferred embodiments thereof, I claim and desire to secure by Letters Patent:

1. A copy sheet useful in a copy system wherein a color-forming reaction occurs between a reactant susceptible to inactivation upon exposure to ultraviolet radiation and a coreactant material reactive with said reactant to produce a contrasting color, said copy sheet comprising a base sheet, and a coating thereon consisting essentially of a binder and an acetoacetonitrile derivative having the formula

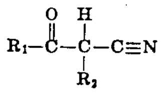

wherein $R_1$ is alkyl, alkoxy, aromatic, substituted aromatic, or aralkyl group, and $R_2$ is aromatic, substituted aromatic or heterocyclic group.

2. A copy sheet as defined by claim 1 wherein the derivation is 2 (p-chloro-Phenyl) acetoacetonitrile.

3. A copy sheet as defined by claim 1 containing additionally a dye sensitizer for the said derivative.

4. A copy sheet as defined by claim 2 containing additionally a dye sensitizer for the said derivative.

* * * * *